United States Patent Office 2,906,715
Patented Sept. 29, 1959

2,906,715
SULPHONAMIDES OF ORGANIC POLYMERS

Walter Hagge and Mathieu Quaedvlieg, Leverkusen-Bayerwerk, and Hans Seifert, Bergisch-Neukirchen, Germany, assignors to Farbenfabriken Bayer Aktiengesellschaft, Leverkusen, Germany, a corporation of Germany No Drawing. Application November 28, 1955
Serial No. 549,573

Claims priority, application Germany November 29, 1954

1 Claim. (Cl. 260—2.1)

The present invention relates to a process of producing sulphonamides of organic polymers containing aromatic nuclei and to the sulphonamides of said polymers.

It has been found that sulphonamides of organic polymers containing aromatic nuclei are obtained by reacting sulphochlorides of organic polymers containing aromatic nuclei with organic amines or with ammonia.

The sulphochlorides serving as starting products are prepared by the action of excess chlorosulphonic acid on polymers containing aromatic nuclei at temperatures below 120° C., the excess chlorosulphonic acid being separated from the sulphochlorides which are formed for instance by introducing the reaction mixture into an 80% sulphonic acid or into glacial acetic acid and filtering off the sulphochloride. It is believed that the chlorsulphonic acid reacts with the aromatic nuclei of the polymers, to form polymers, the aromatic nuclei of which are substituted by chlorosulphonic acid groups.

Examples of suitable organic polymers are polymers of styrene and derivatives of styrene, such as for example vinyl toluene, vinyl ethyl benzenes, vinyl xylenes, vinyl chlorobenzenes, vinyl naphthalenes and derivatives of these compounds. It is also possible to include cross-linked aromatic polyvinyl compounds such as are obtained by polymerization of divinyl benzenes, divinyl toluenes, divinyl ethyl benzene, divinyl chlorobenzenes, divinyl naphthalenes. Such polymers are insoluble in water or aqueous solutions of acids or bases.

Particular importance is attributed to the copolymers of aromatic monovinyl compounds and polyfunctional organic compounds containing more than one polymerizable carbon-to-carbon double bond, such as the aforementioned aromatic divinyl compounds, aromatic compounds containing three vinyl groups, such as trivinyl benzene. In the preparation of the said copolymers, the aromatic monovinyl compounds are preferably used in amounts of 90-99.9% and the polyfunctional compounds in amounts of 0.1–10%. The polymers and copolymers are produced by known methods, preferably by polymerization in aqueous emulsions or suspensions.

Suitable amines for carrying the process into effect are preferably primary and secondary organic amines, such as for example aliphatic, cycloaliphatic, aromatic, araliphatic and heterocyclic amines. Suitable aliphatic amines are primary and secondary alkyl amines, the alkyl radicals of which comprise 1–20 carbon atoms, such as methyl amine, dodecyl amine, octadecyl amine, dimethyl amine, diethylamine and higher dialkyl amines, alkylene diamines, polyalkylene polyamines, as for instance polyethylenepolyamines, polypropylene polyamines, such as ethylenediamine, propylenediamine, hexamethylene diamine, diethylene triamine, triethylene tetramine, tetraethylene pentamine, dipropylene triamine, N.N'-mono substituted alkylene diamines, such as N.N'-diethyl ethylene diamine.

Suitable aromatic amines are aromatic mono and polyamines, such as aniline, phenylenediamines, diphenylamine, mono methyl aniline, nitroaniline, p-amino benzoic acid, anisidine, chloroanilines, and the corresponding derivatives of polynuclear hydrocarbons, such as naphthalene, phenanthrene. As cycloaliphatic amines there come into question cyclopentyl- and cyclohexyl amines.

As heterocyclic amines there may be named piperazine, 2-aminopyrrole, 2.6-diaminopyridine, 2-amino pyridine, 2.5 - diamino - 5 - (aminoethyl)pyrimidine, 1.4-diamino acridine, 2.5-diamino-1, 3, 4-thiodiazole, amino chinolines. A suitable araliphatic amine is for instance benzylamine.

The said amines or ammonia are reacted with the sulphochlorides at room temperature or at elevated temperature in the presence of suitable solvents, such as water, aliphatic and aromatic hydrocarbons, acetone, and methanol, said amines being either applied in stoichiometric quantities as calculated on the amount of sulphochloride applied and on the number of amino groups to be reacted with the sulphochloride or in a surplus over the sulphochlorides. It is recommended at the same time to use acid-fixing agents, such as, for example, carbonates of alkali or other alkali metals, tertiary amines or tertiary heterocyclic nitrogen bases, such as calcium carbonate or pyridine. However, it is also possible to carry out the reaction without using solvents, by the amines being used in excess over the sulpho-chlorides.

The reaction products obtained according to this process have ion-exchanging properties and can therefore with advantage be used for carrying out ion-exchange reactions. Furthermore, these compounds are suitable intermediate products for the production of dyestuffs. They may also be employed for therapeutic purposes.

*Example 1*

350 g. of a styrene pearl polymer cross-linked with 10% divinyl benzene and having the grain size of from 0.3–0.5 mm. are introduced over a period of 1 hour at 65° C. into 1000 cc. of chlorosulphonic acid. The mixture is stirred for a further 16 hours at the same temperature and the excess of chlorosulphonic acid is decomposed with 500 cc. of an 80% sulphuric acid. The polystyrene sulphochloride is obtained with practically a quantitative yield by filtering off from the acid solution.

*Example 2*

500 cc. of polystyrene sulphochloride obtained according to Example 1 are introduced into 4000 cc. of aqueous ammonia solution. The mixture is kept for 16 hours at room temperature with occasional stirring. After filtering with suction, 900 cc. of polystyrene sulphamide are obtained in the form of yellowish brown beads.

|  | Found | Calculated |
|---|---|---|
|  | *Percent* | *Percent* |
| N-content | 6.50 | 7.65 |
| S-content | 16.35 | 17.50 |

*Example 3*

350 g. of a styrene pearl polymer cross-linked with 1% divinyl benzene and having the grain size of from 0.3–0.5 mm. are introduced over a period of 1 hour and at room temperature into 1000 cc. of chlorosulphonic acid. After about 3 hours, the mass has swelled completely and has a light brownish yellow color. The mass is left to stand for a few hours longer in order to complete the reaction. For removing the excess acid constituents, the product is introduced into 2000 cc. of glacial acetic acid and washed with ether after filtering with suction.

Example 4

0.3 mol of the polystyrene sulphochloride prepared as described in Example 3 is introduced into 500 cc. of aqueous ammonia solution. The mixture is stirred for 16 hours at room temperature. After the product has been filtered with suction, it is thoroughly washed with water and dried. 183 g. of polystyrene sulphamide are obtained in the form of yellow beads.

|  | Found | Calculated |
|---|---|---|
|  | Percent | Percent |
| N-content | 6.30 | 7.65 |
| S-content | 16.15 | 17.50 |

Example 5

113 g. of crude polystyrene sulphochloride prepared as described in Example 3 are heated under reflux (65° C.) and while stirring for 16 hours with a solution of 200 g. of aniline and 200 g. of methanol. After filtering with suction, the light brown polystyrene sulphanilide is obtained, and is freed from unreacted aniline etc. by means of steam. The chlorine-free product is dried. Yield: 76 g.

|  | Found | Calculated |
|---|---|---|
|  | Percent | Percent |
| N-content | 5.50 | 5.40 |
| S-content | 11.65 | 12.35 |

Example 6

113 g. of crude polystyrene sulphochloride obtained according to Example 3 are treated under reflux for 16 hours while stirring with a solution of 175 g. of p-nitroaniline in 500 cc. of methanol.

After filtering with suction and through washing with warm methanol and water, there are obtained 75 g. of a reddish brown pearl product of polystyrene sulphonitranilide.

Example 7

90 g. of polystyrene sulphonitranilide prepared as described in the preceding example are reduced with a solution of 210 g. of stannous chloride in 1500 cc. of concentrated hydrochloric acid at boiling temperature, this taking place in 2 hours while stirring. After thorough washing and drying, the polystyrene sulpho-4-aminoanilide is obtained in a yield of 72 g.

The product can be diazotized in the usual manner and reacted with coupling components.

Example 8

280 g. of the polystyrene sulphochloride described in Example 3 are stirred for 20 hours in a boiling solution of 410 g. of 4-aminobenzoic acid (98%) in 100 cc. of methanol. The polystyrene sulpho-4-carboxyanilide thus obtained is first washed with methanol and thereafter with water. The reaction product is obtained with a yield of 270 g.

What we claim is:

A process for the preparation of a novel sulfonamide which comprises reacting (1) the sulfochloride of polystyrene cross-linked with 1–10% by weight of divinyl benzene, with (2) a compound selected from the group consisting of ammonia, aniline, p-nitroaniline, and 4-aminobenzoic acid, the reaction being effected by maintaining the reaction mixture at a temperature of from room temperature to about 65° C. for 16 hours, after which the solid reaction product is separated from the the reaction mixture and dried.

References Cited in the file of this patent
UNITED STATES PATENTS

| 2,366,007 | D'Alelio | Dec. 26, 1944 |
| 2,618,655 | Dickey et al. | Nov. 18, 1952 |
| 2,725,368 | Reynolds et al. | Nov. 29, 1955 |
| 2,759,816 | Minsk | Aug. 21, 1956 |
| 2,778,813 | Gaspar | Jan. 22, 1957 |